Oct. 27, 1931.  W. G. CHRISTOPHERSON  1,828,925
JOINT AND METHOD OF MAKING THE SAME
Filed July 19, 1930
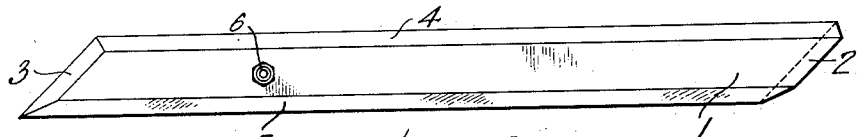
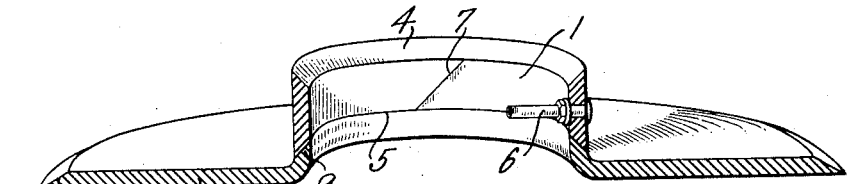
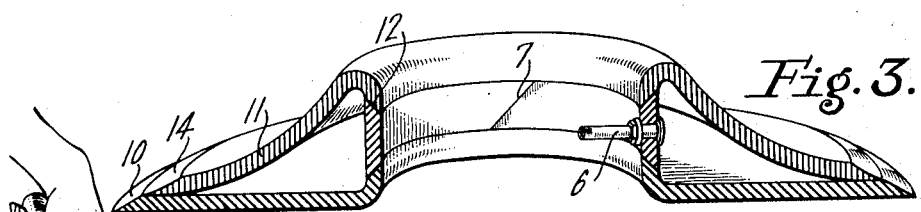
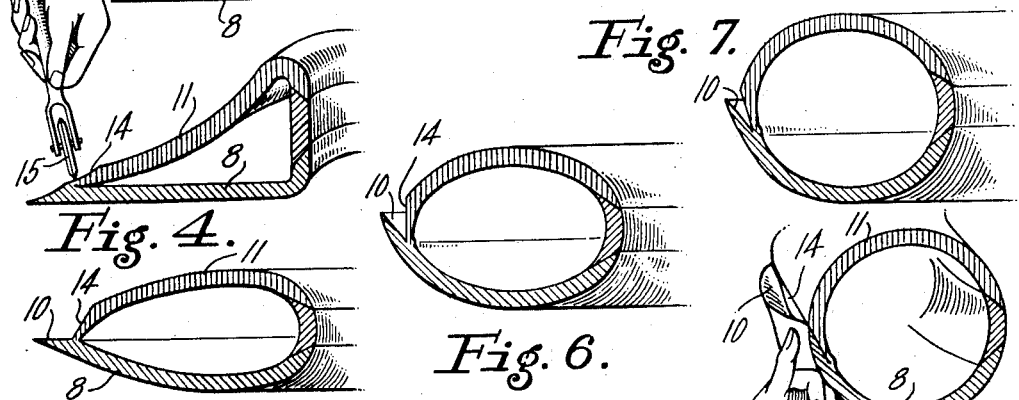
INVENTOR.
William G. Christopherson
BY
ATTORNEYS.

Patented Oct. 27, 1931

1,828,925

UNITED STATES PATENT OFFICE

WILLIAM G. CHRISTOPHERSON, OF GROSSE POINTE PARK, MICHIGAN, ASSIGNOR TO MORGAN & WRIGHT, OF DETROIT, MICHIGAN, A CORPORATION OF MICHIGAN

JOINT AND METHODS OF MAKING THE SAME

Application filed July 19, 1930. Serial No. 469,183.

My invention broadly relates to joints between layers of adhesive material and methods of making the same, and more particularly to curing bags and methods of making the same.

In the manufacture of many rubber articles it is customary to provide an inflatable form on which the articles are mounted during vulcanizing. As an example, in the manufacture of automobile tires it is customary to provide a curing bag which is placed within the tire casing and inflated under considerable pressure during the period when the tire casing is in the vulcanizing mold. The pressure within the curing bag causes the material of the tire to conform to the configuration of the mold surfaces whereby tread configurations and lettering are formed in the tire surfaces. The curing bag required for tires is in the shape of an annulus.

In the ordinary practice of manufacturing curing bags adapted for use with tire casings, the curing bag is made by forcing a strip of rubber through a die to produce a length of tubular stock having a cross section somewhat similar to the cross section of the tire casing. This tubular stock is cut to the desired lengths with the ends cut on a bevel so as to form a slanting or bias joint when the ends are spliced together. Where the mean circumference of the curing bag is fairly large the material in the curing bag adjusts itself to the differences between the inner and outer peripheral lengths without causing a material amount of buckling and/or distortion of the bag surfaces.

With tires of relatively small internal diameter and a relatively large cross sectional diameter, it is difficult to shape a curing bag from an initially straight tubular body due to the relatively greater difference between the inner and outer peripheral lengths of the bag. At the present time there is a tendency in the tire art to produce tires of smaller internal or rim diameters and of relatively larger cross sectional diameters. Where tubes of initially straight stock are bent into the shape of a curing bag for such a tire, considerable distortion of the surface of the bag and/or buckling takes place due to the relatively greater difference between the inner and outer peripheral lengths of the bag. The initial material of the bag must adjust itself this difference in order to give satisfactory results and particularly a uniform pressure over all of its area in engagement with the tire carcass.

I provide a curing bag and method of making the same in which a plurality of individually formed sections are brought together and assembled. In assembling the curing bag certain of the edges are brought together to form a joint by a method which is applicable to structures other than curing bags. In assembling the curing bag, an inner or rim strip is formed with beveled edges to which layers of rubber are united. The layers are preferably assembled with their edges on different circumferences. The rubber layers ultimately form the walls of the bag which engage the inner surface of the tire. For bringing the edges of the rubber layers together, the edges are beveled and placed in offset relation. A stitch is taken between the outer beveled edge of the layer of less diameter and the material of the other layer adjacent to or at its beveled edge. Upon applying pressure internally of the stitch, as by the admission of fluid under pressure to the partially formed curing bag, the edges of the layers tend to turn about the stitch thus formed and bring the beveled edges into engagement to form a joint. The joint is then completed by the application of pressure and a curing process.

The accompanying drawings illustrate a present preferred embodiment of the invention and method of practicing the same, in which Figure 1 is a plan view of a developed rim strip;

Fig. 2 is a transverse sectional view of the rim strip after it has been formed into a band with the layer constituting one of the side walls of the curing bag attached thereto;

Fig. 3 is a view similar to Fig. 2 showing the construction after the application of the second layer;

Fig. 4 is a sectional view of a portion of the assembly shown in Fig. 3 and illustrating the manner of forming a stitch between the layers;

Figs. 5, 6 and 7 are views showing the progressive turning movement of the layers about the stitch as the curing bag is inflated;

Fig. 8 is a detail view illustrating the manner of closing the joint between the layers; and Fig. 9 is a broken cross sectional view of a completed curing bag.

Referring to the drawings, in the construction of a curing bag a rim strip 1 is provided. The strip 1 is provided with beveled edges 2 and 3 at its ends and beveled edges 4 and 5 at its sides. A connector 6 for communication with a source of fluid under pressure is provided in the strip 1 while in a flat condition. The strip 1 may be formed by beveling and cutting a strip of rubber by manual or machine operation. The strip may also be formed by forcing the rubber through dies to form a continuous length of the desired cross section from which the strip may be cut with the beveled edges 2 and 3.

The beveled edges 2 and 3 are brought together and joined to form the rim strip 1 into a band, as illustrated in Figs. 2, 3 et seq. The beveled edges 2 and 3 serve to increase the area of a joint 7 formed therebetween. The beveled edges also faciliated the practical making of the joint 7 as the beveled edges enable a radial pressing force to be applied to the edges to firmly press them together. Prior to the forming of the joint 7 it is customary to roughen the surfaces to be attached, as by brushing with a wire brush. An adhesive, such as gasoline, may be used. The strip 1 is preferably of uncured rubber.

Referring particularly to Fig. 2, a washer or layer 8 of uncured rubber is provided with an inner beveled edge 9 and an outer beveled edge 10. The edge 9 is joined to the beveled edge 5 of the strip 1 in any suitable manner.

Referring to Fig. 3, a second layer or washer 11 having an inner beveled edge 12 is secured to the beveled edge 4 of the band 1. The layer 11 is also preferably of uncured rubber and is of a width such that an outer beveled edge 14 lies within the periphery of the beveled edge 10 of the layer 8 when assembled, as shown in Fig. 3. To prevent the layers 8 and 11 from adhering over the major portions of their adjacent surfaces, the surfaces are covered with a powder, such as soapstone, or the like. The adjacent marginal edges of the layers 8 and 11 are left free from such a coating.

Referring to Fig. 4, a stitching tool 15 is applied near the periphery of the beveled edge 14 to cause the inner or lower uncoated surface of the layer 11 to adhere to the uncoated area of the layer 8. The stitch is carried around the entire periphery of the layers 8 and 11 so that it forms a seal between the uncured layers of rubber which withstand a slight fluid pressure.

Referring to Figs. 5, 6 and 7, pressure, preferably in the form of fluid pressure admitted through the connector 6, is applied internally of the layers 8 and 11. The application of the pressure causes the band 1 and layers 8 and 11 to tend to assume an annular shape during which time the bevelled edges 10 and 14 of the layers 8 and 11, respectively, turn around the stitch, thereby bringing the outer periphery of the beveled edge 10 adjacent to and/or into engagement with the initial inner periphery of the beveled edge 14. The joint tends to close by reason of the tacky surfaces of the layers or it may then be closed by the application of pressure against the internal fluid pressure of the annulus, as is shown in Fig. 8. While I have illustrated the application of manual pressure for closing the joint in Fig. 8, it is to be understood that the joint may be closed by the application of pressure by other means.

The assembly is then placed in a curing mold under pressure to produce the finished curing bag shown in Fig. 9. The curing operation merges the several materials at the joints so that an integral bag is obtained at the end of the curing operation. As the strip 1 and the layers 8 and 11 are separately formed from substantially flat stock, the outlines of their developed shapes are such as to cause them to unite in the finished bag without extensive deformation or buckling due to internal adjustments of the shapes of the materials.

While I have illustrated the formation of the joint in connection with uncured rubber layers or washers, it is to be understood that such a joint may be formed between other types of adhesive substances.

While I have shown and described a present preferred embodiment of the invention and method of making the same, it is to be understood that the invention may be otherwise embodied and practiced within the spirit thereof and the scope of the appended claims.

Having thus described my invention, what I claim and desire to protect by Letters Patent is:

1. In the method of joining the edges of adjacent layers of adhesive material, the steps comprising superimposing layers of adhesive material having tapered edges with the tapered edges in an offset relation, stitching said layers along the outer edge of the inner layer to form a seal, and then applying pressure between the layers to produce a relative turning movement about said stitch between said edges to bring them together.

2. In the method of joining the edges of adjacent layers of adhesive material, the steps comprising superimposing layers of adhesive material having tapered edges with the tapered edges in an offset relation, stitching said layers along the outer edge of the inner layer to form a seal, and then applying fluid pressure between the layers to produce a relative turning movement about said stitch between said edges to bring them together.

3. In the method of joining the edges of adjacent layers of adhesive material, the steps comprising superimposing layers of adhesive material having tapered edges with the tapered edges in an offset relation, stitching said layers along the outer edge of the inner layer to form a seal, then applying fluid pressure between the layers to produce a relative turning movement about said stitch between said edges to bring them together, and then applying external pressure to complete the joint.

4. In the method of joining the edges of adjacent layers of rubber, the steps comprising superimposing layers of rubber having tapered edges with the tapered edges in an offset relation, stitching said layers along the outer edge of the inner layer to form a seal, and then applying pressure between the layers to produce a relative turning movement about said stitch between said edges to bring them together.

5. In the method of joining the edges of adjacent layers of rubber, the steps comprising superimposing layers of rubber having tapered edges with the tapered edges in an offset relation, stitching said layers along the outer edge of the inner layer to form a seal, then applying fluid pressure between the layers to produce a relative turning movement about said stitch between said edges to bring them together, and then applying external pressure to complete the joint.

6. In the method of making a curing bag, the steps comprising providing a base strip having beveled edges, providing layers of rubber having inner and outer beveled edges, attaching the inner beveled edges of the layers to the beveled edges of the base, disposing the outer beveled edges of the layers in offset relation, stitching an edge of one layer to the material of the other layer, applying pressure between the layers to cause the outer beveled edges of the layers to turn relative to each other about said stitch, and then closing the joint between the edges.

7. In the method of making a curing bag, the steps comprising providing a base strip having beveled edges, providing layers of rubber having inner and outer beveled edges, attaching the inner beveled edges of the layers to the beveled edges of the base, disposing the outer beveled edges of the layers in offset relation, stitching an edge of one layer to the material of the other layer, applying pressure between the layers to cause the outer beveled edges of the layers to turn relative to each other about said stitch, then closing the joint between the edges, and curing the bag to merge the materials at the several joints.

8. A curing bag comprising an inner peripheral portion formed from a band and side wall portions secured thereto, said side wall portions being united at their outer edges to form an annulus with said band.

9. In the method of making a joint, the steps consisting in supplying layers of material having tapered edges with the edges disposed in offset relation, stitching the end of one of the tapered edges to the material of the other layer, and relatively rotating the adjacent materials of said layers about said stitch to close the joint between said material.

10. In the method of making a curing bag, the steps consisting in providing a cylindrical base strip, providing washers of rubber with their outer edges beveled, attaching the inner edges of the washers to the base, disposing the outer beveled edges of the washer in offset relation, stitching an edge of one washer to the material of an other washer, applying pressure between the washers to cause the outer beveled edges of the washers to turn relative to each other about said stitch, and then closing the joint between the edges.

Signed at Detroit, county of Wayne, State of Michigan, this 14th day of July, 1930.

WILLIAM G. CHRISTOPHERSON.